United States Patent

Rieve et al.

[15] 3,635,814
[45] Jan. 18, 1972

[54] CATALYTIC COAL CONVERSION PROCESS

[72] Inventors: Robert W. Rieve, Springfield; Harold Shalit, Drexel Hill, both of Pa.

[73] Assignee: Atlantic Richfield Company, New York, N.Y.

[22] Filed: Nov. 25, 1970

[21] Appl. No.: 92,613

[52] U.S. Cl. ............................................................. 208/10
[51] Int. Cl. .............................................................. C10g 1/08
[58] Field of Search ................................................. 208/10

[56] References Cited

UNITED STATES PATENTS 3,117,921  1/1964  Gorin ........................................ 208/10
3,183,180  5/1965  Schuman et al. ......................... 208/10

Primary Examiner—Delbert E. Gantz
Assistant Examiner—Veronica O'Keefe
Attorney—Blucher S. Tharp and David Folzenlogen

[57] ABSTRACT

The hydroconversion of coal solids is accomplished at conversion conditions by bringing coal solids, molecular hydrogen and catalyst solids into contact in a reactor. The catalyst solids are comprised of catalytically active substance containing molybdenum on an alumina support material. The catalyst solids are in the size range between 3 and 200 mesh U.S. Sieve Series and have a pore volume of at least 0.015 milliliter (STP) per gram and an accessible pore distribution such that at least 50 percent of the pores are greater than 1,100 angstroms.

16 Claims, 2 Drawing Figures

INVENTOR
ROBERT W. RIEVE
HAROLD SHALIT

*M. David Folgenlogen*
ATTORNEY

CATALYTIC COAL CONVERSION PROCESS

BACKGROUND OF THE INVENTION

This invention relates to catalytic hydroconversion of coal to liquid and gaseous products. The invention has particular reference to a process for hydroconversion of coal utilizing a catalyst having a rough surface or unusually large pores.

Much has been published on the conversion of coal solids to liquid and gaseous products. The most attractive processes for coal conversion involve subjecting solid pulverized coal to molecular hydrogen in a catalytic reactor under conditions which caused the constituents of the coal to liquefy and undergo some degree of hydrogenation. In one process, coal conversion involves slurrying solid pulverized coal in either dry or wet state with a hydrogen donor solvent. The mixture is charged to a reactor through which an excess of molecular hydrogen is simultaneously flowed. The coal solids and hydrogen are contacted in the presence of solid catalyst particles which are expanded and ebullated into a state of random motion as described in U.S. Re. Pat. No. 25,770.

Considerable work has been carried out to develop hydrogenation catalyst. Emphasis has been placed on the size of the catalyst, its resistance to attrition, its stability, its density and its regeneration characteristics. Generally, active catalytic metals are not employed per se. More commonly, the active catalytic metals are impregnated in or deposited on a support or carrier. The support is a solid skeletal particle pierced with a plurality of pores and channels so that the fluids to be reacted may be flowed through the particle in a desired direction. The flow channels may be generally parallel and extend through the support from one side to the opposite side or the channels may be a network that permeates the support particle. Many attempts have been made to devise ways and means of increasing the total surface area of these flow channels on which the catalytic agent is deposited or extended. For example, the superficial surface area of the support particle may be on the order of a hundredth of a square meter per gram while the total surface area is typically hundreds of times greater or on the order of several hundred square meters per gram. It is generally concluded that the greater the total surface area of the flow channels, the greater will be the activity of the catalyst. Some attention has also been given to pore size; however, reports of such activities are usually concerned with maintaining or effectively utilizing the total surface area of the flow channels. Generally, it has been stated that the pores should be larger than the molecules to be reacted. With reference to catalytic conversion of coal liquids, the work of previous investigators indicates that the pore size for a catalyst should range between 50 and 250 angstroms with the most frequent pore size being 60 angstroms.

Inorganic constituents such as iron and titanium in coal present a special problem when coal solids are catalytically hydrogenated with supported catalysts. When high total surface area, dense catalyst supports such as the gel-type aluminas are used, titania forms a tight skin coating around the catalyst particle. This coating effectively blocks much of the catalyst from further use. It would be desirable to increase the tolerance of coal conversion catalysts for titanium and iron compounds.

This concern for increasing the total surface area of flow channels and increasing the number of channels, which in turn leads to small sized channels, limits the technique of manufacturing coal catalysts and is contrary to what has been unexpectedly found concerning catalytic hydrogenation of coal solids.

SUMMARY OF THE INVENTION

A study of catalytic activity in the hydroconversion of coal solids led to an unexpected observation. Most supported hydrogenation catalysts are prepared on high total surface area supports to give good dispersion of the hydrogenation component and large sorption surface for the hydrogenatable substrate. It is, therefore, expected that increases in the total pore surface area or volume per particle will reflect in a corresponding increase in catalyst activity, yet beyond a certain point such reflection was absent in coal hydrogenation. In the case of hydroconversion of coal solids, the process of liquefaction and conversion is such that the coal molecules rely mainly on surfaces which behave like external surfaces. The effectiveness and efficiency of catalytic liquefaction and hydroconversion of coal are, therefore, markedly improved by employing a hydrogenation catalyst comprised of solids with unusually large pores or fissures. Such particles are unusually rough or fissured and provide more surface area that behaves like external surface areas.

The unusually rough catalyst solids have further advantage of physically accommodating or otherwise preventing formation of a continuous coating of titania or the like around the catalyst pellet. With high total surface area, normal pore, dense catalyst supports, titanium penetrated only slightly into the surface and formed a tight skin coating around the catalyst pellet. In contrast, with the catalyst particles of this invention, titanium intruded much further into the pellet and did not form a tight continuous coating.

The catalyst particles of this invention for hydrogenation of coal solids are comprised of a catalytically active substance containing molybdenum on an alumina support material. The catalyst particles are in the size range between 3 and 200 mesh U.S. Sieve Series and have a pore volume of at least 0.015 milliliter (STP) per gram and an accessible pore distribution such that at least 50 percent of the pores are greater than 1,100 angstroms. Preferably, at least 50 percent of the pores will be greater than 3,000 angstroms.

The catalyst particles are employed in a process for hydroconversion of coal solids to liquid and gaseous products. In the process, coal solids, gas containing molecular hydrogen and catalyst solids are brought into contact in a coal reaction zone under conditions at which a major portion of the coal solids undergoes hydroconversion to gaseous and liquid products. The coal solids are preferably in a size range of from 8 mesh to 350 mesh and are fed to the reaction zone at a rate between 15 and 250 pounds per hour per cubic foot of reaction zone. The ratio of the rate at which coal solids are fed to the reaction zone to the catalyst solids in the reaction zone may be in the range between 0.5 and 5.0. Hydrogen is fed to the reaction zone at a rate sufficient to maintain a hydrogen partial pressure between 400 and 4,000 p.s.i.a. The reaction zone is preferably at a zone temperature between 750° F. and 1,000° F. The coal solids may be mixed with a liquid slurry agent to form a slurry containing less than 70 percent by weight of slurry of coal solids. The liquid slurry along with other reaction fluids, such as, hydrogen and reactor recycle liquid, are passed upwardly through the reaction zone at a velocity sufficient to maintain the catalyst solids in random motion in the liquids that are in the reaction zone.

BRIEF DESCRIPTION OF THE DRAWINGS

This invention can best be understood by reference to the drawings, wherein.

DESCRIPTION OF PREFERRED EMBODIMENTS

Figure 1:
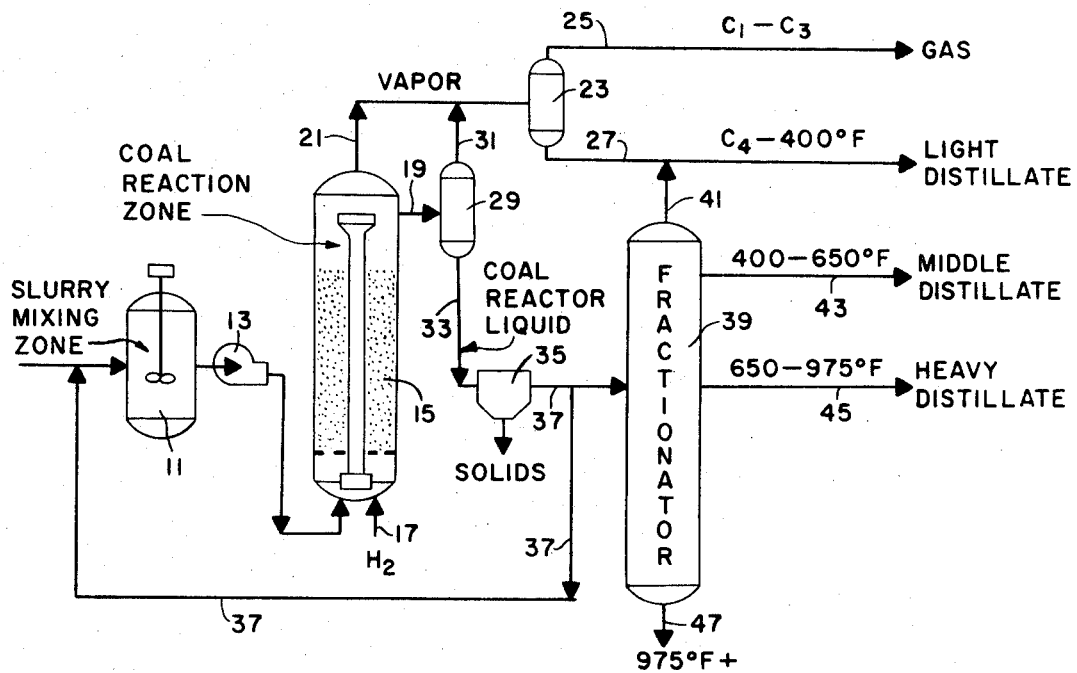
FIG. 1 is a diagrammatic sketch of a mixing zone, a reaction zone, a solids separation zone and a fractionation zone wherein coal solids are converted to liquid and gaseous products.

The flow sketch of FIG. 1 illustrates the preferred process for hydroconversion of coal solids to liquid and gaseous products. The term "coal" includes any form of solid carbonaceous substance suitable for catalytic hydroconversion, for example, bituminous, semibituminous, subbituminous grades of coals including lignites, kerogen, peats, semianthracite, and the like. Mined coal is pulverized to a size wherein most of the coal solids are less than 8 mesh U.S. Sieve Series, and are in the size range between 8 mesh and 325 mesh depending on the type of coal hydroconversion process. The preferred range is between 40 mesh and 200 mesh. The pulverized coal may or may not be dried as it is sometimes preferred to charge the coal with water. The coal which may or may not be preheated in the presence or absence of hydrogen is introduced into mixing zone 11 where it is mixed with a hot liquid slurry agent. The liquid slurry agent is usually a hydrogen donor and has a boiling point in excess of 400° F. The ratio of liquid slurry agent to coal will range between 0.1 and 10. From the mixing zone, the coal slurry is pressurized by pump 13 and pumped into coal reaction zone 15. A combination of coal solids with a liquid slurry agent provides a practical method of handling the coal and charging it into the high-pressure reactor. It is difficult to handle viscous materials, for example, materials with a viscosity above 3 poises. The viscosity of the slurry depends primarily upon temperature, solids concentration and composition of the liquid slurry agent. Sometimes, therefore, it is preferred to preheat the coal solids or the liquid slurry agent, or both, or to add a less viscous liquid to the slurry. Because of the difficulties involved in pumping high solids content slurries, a preferred slurry will generally contain less than 70 percent coal solids by weight of slurry or mixture.

In the reaction zone, the coal solids undergo liquefaction and hydroconversion. This conversion is accomplished in the presence of molecular hydrogen and a preferred catalyst as hereinafter described. A hydrogen-containing gas is introduced into the reaction zone by way of hydrogen inlet line 17 which could consist of several inlets spaced appropriately on the reactor. The reactor may be one of several types as described in the coal conversion art. The reaction zone is operated under conditions at which a major portion of the coal solids in the slurry rapidly undergoes conversion to liquid and gaseous products. The reactor will be operated at a temperature of between 500° F. and 1,000° F. with a total pressure ranging between 500 and 5,000 p.s.i.g. The preferred temperature range will be between 750° F. and 925° F. depending upon the activity of the catalyst and the residence time of the reactants. The partial pressure of molecular hydrogen in the reactor will be between 400 and 4,000 p.s.i.a. Hydrogen is injected into the reactor at a rate sufficient to maintain this hydrogen partial pressure and the desired amount of hydrogen in solution in the liquids in the reactor. Generally, the injection rate will range between 6,000 and 75,000 standard cubic feet (s.c.f.) per U.S. ton of reactants charge to the reaction zone depending on the type of hydroconversion process and the amount of hydrogen consumption. The preferred hydrogen injection rate is between 25,000, and 75,000 s.c.f. per ton of reactants. The rate of coal charge per effective cubic foot of reactor volume will be between 15 and 250 pounds per hour. As mentioned previously a preferred type of reactor is the ebullated bed and the preferred coal charge rate per cubic foot will range between 15 and 200 pounds per hour. The ratio of the coal feed rate to catalyst in the reaction zone on a volume basis will be in the range between 0.5 and 5.0. The catalyst size will be in the size range between 200 mesh and 3 mesh.

In a preferred system, reaction zone 15 will be a total mix reactor such as an ebullated bed of the type described in the U.S. Re. Pat. No. 25,770 wherein coal liquids and solids are contacted with hydrogen in the presence of a catalyst under conditions such that the catalytic particles remain in an expanded state to occupy a volume greater than 10 percent of the volume of the solids in a settled state. The net flow of the coal solids is upward and the coal solids, liquid slurry agent and other reactor liquids, such as, hydrogen and recycle liquid pass upward at a velocity such that the catalyst particles are placed in random motion in the reactor and in a manner such that the catalyst particles stay in the reactor. This type of reactor involves a high rate of recycle of the reactor liquid and is essentially a total mix reactor wherein the concentration of fractions in the reactor liquid is uniform from top to bottom.

The catalyst may be added to the reactor separately from the slurry or with the slurry of liquid agent and coal solids.

In the reaction zone, coal solids, liquid slurry agent, hydrogen and catalyst are in intimate association. The solid coal molecules are three-dimensional and highly cross-linked. At reactor conditions, when the solid coal liquefies, hydrogen aids fixing and stabilization of the molecules. This liquefaction of a major portion of the coal is aided by the presence of the liquid slurry agent or the reactor liquid. The hydrogen consumption to simply fix the molecules at the time of liquefaction depends on the convertible carbon content of the coal and has been estimated to be less than 1.5 pounds of hydrogen per 100 pounds of coal solids. Additional hydrogen is consumed in partially hydrogenating reactor liquids and in hydrocracking. In a hydroconversion process, the hydrogen consumption will range between 0.5 pounds and 15 pounds per hundred pounds of reactant. The hydrogen consumption rate depends on reactor hydrogen partial pressure, reactor temperature, reactant residence time, catalyst activity and composition of the reactants.

The reactor fluids leave reaction zone 15 so that the products may be separated in any well-known manner depending on the type of reaction zone. As illustrated in FIG. 1, the preferred reaction zone is of the total mix variety, such as an ebullated bed, and reactor liquids are withdrawn overhead by the way of effluent line 19. The vapor components of the reaction are removed by way of gas effluent line 21. The reactor vapors contain molecular hydrogen and other light or low boiling materials. The reactor vapors may be treated in any manner in separation zone 23 to separate the noncondensable gases to gas line 25 from the condensable ones passing to light distillate line 27. The particular vapor handling system will depend on the type of process and reaction system. A gas stream composed predominantly of hydrogen is usually recycled to the reaction zone for further reaction with coal and reactor liquids.

The reactor liquid containing unconverted coal ash is removed through liquid effluent line 19. Preferably, this liquid effluent will pass to a liquid separator 29 or gases will be removed overhead through line 31 to gas effluent line 21. For the total mix reactor system, liquid separator 29 should be operated under conditions which remove only light products such as those in the naphtha or light distillate range and do not remove any liquids from the reactor liquid.

The reactor liquids from liquid separator 29 are passed through line 33 to optional solids separator 35 where the coal ash and char are removed prior to passing a portion of the reactor liquids through line 37 to the mixing zone. The amount of reactor liquids passed in this manner to mixing zone 11 will vary depending on whether or not the reactor liquid is to be used as liquid slurry agent.

The remaining portion or all of the reactor liquids from solids separator 35 are passed to fractionation zone 39 where the reactor liquid is separated into several product fractions. As shown in FIG. 1, fractionation zone 39 is a distillation column operated in a standard fashion to control the boiling ranges of the distillable product fraction. For example, overhead of the column, light ends in the butane to 400° F. range are removed by way of line 41. Such products are frequently used for gasoline production. Light distillates in the 400° to 600° F. range are removed in line 43. Such products are normally refined or used for heater oil or jet fuel production. Heavy distillates in the 650° to 975° F. range are removed in line 45. Such products are normally refined in a hydrocracker or catalytic cracker, or are used in heavy fuel blending. The 975+° F. residual fraction is removed in line 47 and is usually used for fuel purposes, coking or extreme hydroconversion. The distillation column may be operated to separate any desired distillable product fraction or to increase the boiling range of a particular product fraction depending on the need for a particular product fractions.

Figure 2:
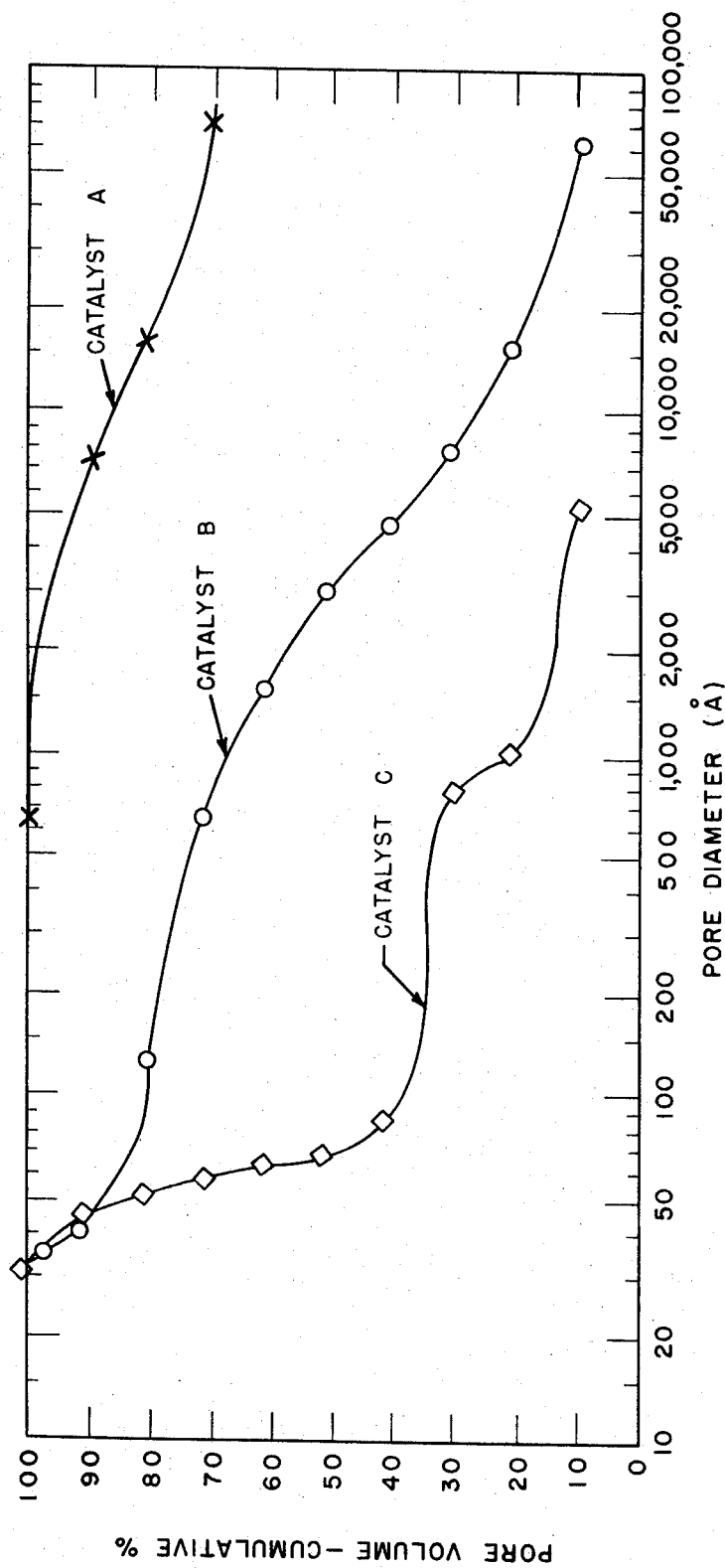
FIG. 2 shows the pore distribution for three molybdenum containing, alumina catalysts in which pore diameter in angstroms is plotted versus cumulative percent of pore volume.

As mentioned previously, the coal hydroconversion process utilizes a unique catalyst having unusually large pores or a rough or fissured surface. In studies involving catalytic hydroconversion of coal solids, it was noted that anomalous results were obtained indicating a lack of correlation between normal catalyst parameters and activity. It was conceived and conjectured that the data suggested that only those surfaces which behave as external surfaces (not the total internal surface) were being used in the coal solids hydroconversion process when dense, high total surface area, normal pore catalyst supports were used. This conception was tested by preparing a cobalt-molybdenum catalyst on a tabular alumina support material. The tabular alumina support had no true pore structure when compared to the activated alumina supports used for standard commercial hydrogenation catalysts. The catalyst was prepared by aqueous impregnation of cobalt nitrate and ammonium molybdate to provide 3.4 percent by weight of cobalt oxide and 13 percent molybdenum oxide on the dry catalyst. The catalyst was dried at 100° C. in an oven and used with no further calcination or pretreatment. The catalyst had a very low total surface area when compared to standard commercial cobalt-molybdenum catalyst. As shown by FIG. 2, the specially prepared catalyst A has an accessible pore distribution such that pores are very large when compared to the accessible pore distribution of catalyst C for a standard commercial cobalt-molybdenum catalyst on an activated gamma-alumina support. Eighty percent of the prepared catalyst pores were over 10,000 angstroms while 50 percent of the gamma-alumina pores were below 100 angstroms. In one experiment comparing this special catalyst with a commercial cobalt-molybdenum, activated alumina catalyst, the weight percents of the products shown in table I were obtained at 800° F. using coal obtained from Pittsburgh 08 seam from West Virginia under a hydrogen pressure of 3,000 p.s.i.g. with a residence time of 30 minutes.

TABLE I

| Product | Cobalt-molybdenum on activated alumina area = 256 m.²/g. | Cobalt-molybdenum on tabular alumina area = <0.1 m.²/g. |
| --- | --- | --- |
| Gas | 14.8 | 30.0 |
| Light Oil (<500° F. BR) | 12.8 | 12.5 |
| Heavy Oil (>500° F. BR) | 37.7 | 26.3 |
| Asphaltenes | 2.2 | 4.7 |
| Water | 9.9 | 7.7 |
| % Conversion | 77.3 | 81.2 |

Normally, it would be expected that the great difference in total surface area between the activated alumina and the special tabular alumina catalysts would cause a wide difference in catalyst activity. This difference was not present. This supported the conception that in hydroconversion of coal solids greater emphasis should be given to forming catalyst particles with large pores or rough or fissured surface, that is, greater emphasis should be given to increasing the surface area of the catalyst which behaves like external surfaces. Large internal surface areas are relatively unimportant if the pore openings or diameters (distance between the walls of the pore) are small, that is, on the order of 500 angstroms or less. A superior catalyst should maximize pore size and the surface area associated with these large pores. The preferred catalyst had an accessible pore distribution with as least 50 percent of the pores having a size greater than 1,100 angstroms and a volume of at least 0.015 milliliter (STP) per gram which volume relates to surface area. The superior catalyst is comprised of catalyst solids in the size range between 3 and 200 mesh with a catalytically active substance containing molybdenum, including compounds thereof, deposited on an alumina support material with at least 0.015 milliliter per gram pore volume. As will be hereinafter described, the preferred catalytically active substances contain molybdenum in combination with cobalt or nickel, or both. For example, in a series of tests using 20 grams of Pittsburgh 08 coal with 20 grams of 675°–775° F. boiling range coal derived liquid slurry agent and 2.5 grams of 100–200 mesh catalyst at temperatures between 775° F. and 900° F., the only catalyst which gave better results than a presulfided cobalt-molybdenum gamma-alumina catalyst with a pore size distribution illustrated by catalyst C of FIG. 2 was a cobalt-molybdenum catalyst with a pore size distribution illustrated by catalyst B of FIG. 2. For example, at 825° F. the superior catalyst gave 89 percent conversion with 3.0 grams of asphaltenes while the next best presulfided cobalt-molybdenum catalyst gave 86 percent conversion with 3.0 grams of asphaltenes. It is believed that presulfiding the catalyst improves the results.

As mentioned previously, the catalyst of this invention is comprised of a molybdenum containing, alumina base catalyst characterized by possessing unusually large external or surface pores with adequate total surface area to accomplish the desired degree of hydroconversion of coal solids. The adequacy of the total surface area is governed by the size and distribution of the pores or fissures and the pore volume. The pore volume is at least 0.015 milliliter per gram of catalyst and preferably in the range of from 0.2 to 0.5 milliliters (at standard conditions) per gram. The walls or surface of the catalyst particles contain pores and fissures distributed across essentially the entire surface of the catalyst. These pores may be one or more of a variety of cross sections with each pore being defined by the walls of the support material and separated by a wall of such material from another pore. The pores can be in any shape, that is, any geometric configuration such as circles, squares, triangles, rectangles, hemispheres, and the like, so that the surface of the catalyst is unusually rough, corrugated, latticed, fissured or honeycombed with unusually large openings. Such openings or pores should be as large as practical while maintaining the strength of the catalyst particles and the minimum pore volume or surface area. The pores are large enough to permit free or initial contact of the coal reaction fluids with wall surface of the pores while preventing plugging by the particulate matter present in coal liquids, for example, coal ash or char which is frequently between 1 and 5 microns in size. The surfaces provided by these large pores perform like external surfaces and the coal conversion may readily occur on these surfaces.

The unusually large pores have the further advantage of physically accommodating or otherwise preventing formation of a continuous coating of inorganic constituents of iron and titanium or the like in the coal solids around the catalyst particles. For example, with high total surface area, normal pore, dense catalyst supports, titanium penetrated only about 10 to 50 microns into the surface and formed a tight skin coating around catalyst particles. In contrast, with the superior coal catalyst particles of this invention, titanium intruded much further into the particles and did not form the tight continuous coating. Intrusion was extensive in the first 200 microns and significant all the way into the center of the particle.

The superior catalyst support is an alumina which is an article of commerce and readily obtained. Alumina normally contains about 90 percent or more of alumina oxide, $Al_2O_3$, which is usually formed by careful dehydration of certain alumina hydrates. The solid alumina support is substantially inert and is capable of maintaining its shape and strength at the temperatures and pressures used in hydroconversion of coal solids. The bulk density of the alumina varies between 2.5 and 4.0 grams per cubic centimeter. Curve "B" of FIG. 2 shows that the superior catalyst has an accessible pore distribution such that at least 50 percent of the pores have a diameter greater than 1,100 angstroms. Preferably, at least 50 percent of the pores will be above 3,000 angstroms. The pore size distribution may be measured in any accepted manner. The cumulative pore volume distribution will also be determined by conventional procedures. The pore size distribution is best measured by mercury porosimeter and the surface area by nitrogen absorption. Such methods are well known in this art. An electron microprobe was used to measure metal intrusion and investigate large fissures.

A molybdenum-containing active catalytic substance is deposited or impregnated on the alumina support particles. The term "molybdenum" includes molybdenum in both its elemental and compound forms and includes oxides, sulfides, halides, molybdate, chromate molybdenum trioxide, molybdena, and the like. The preferred catalytic active substances will also contain nickel or cobalt, or both, such as cobalt molybdate, cobalt oxide molybdena complexes, and the like. The catalytically active substances will be impregnated in or deposited on the surfaces of the alumina support in accordance with standard procedures. Generally, the molybdenum containing substance is formed on the alumina after formation of the desired pore volume, size and distribution; however, the catalytically active substance could be deposited or impregnated either before or after formation of the finished alumina support.

The molybdenum containing substance may be applied by dispersing such substance and adding it to the support material or alternately, by forming an aqueous slurry of the molybdenum containing substance and the alumina support material. The coated support material is dried or calcined. A convenient method comprises merely immersing the alumina support in an aqueous solution of the molybdenum containing substance for a time sufficient to insure absorption of the molybdenum containing catalytic active substance. The catalyst is then dried and calcined to form the final active form of the catalyst. In general, calcining temperatures will be above 900° F. Calcination may be conducted in air or in contact with other gases such as oxygen, nitrogen, hydrogen-free gas, etc. Vacuum conditions may also be used. The catalytic reactive substance will be present in a weight ratio of about 1 to 50 percent by weight of support.

A variety of procedures may be employed for preparing the alumina contact support. The preferred alumina support will be eta alumina, which can be prepared by precipitating beta trihydrate alumina gel and thereafter drying and calcining the alumina at 480° to 950° F. to expel hydrated water. As disclosed in the art, the support material may be combined with pore growth promoters to achieve the desired results. Pore growth promoting conditions include heating the material in the presence of a gas or a metal compound, steaming at elevated temperatures, treating with hydrogen at elevated temperatures, and the like. The set of conditions chosen for promoting the growth of the pores will vary depending upon the stability, crystalline structure, chemical composition and other characteristics of the alumina structure material. Promoters for changing the physical properties of alumina may be used in concentrations ranging between 0.1 to 10 weight percent and may be used at any stage of the process for preparing the alumina support material. In one procedure, the large pores or fissures may be introduced during preparation of the base material or during actual conversion of the base material to the proper structure by the use of strong mineral or organic acids. Another procedure involves including in the alumina structure material a relatively large amount of removable material. Such removable materials may be volatile or are ones that are decomposable in the gases by the application of heat. For example, ammonium carbonate, naphthalene, anthracene, volatile aromatics, and the like including sulfur have been used. The amount of such removable solids used during such preparation will depend on such factors as the pore size, and the strength of the final alumina material.

In accord with the provisions of the patent statutes, the principle and preferred construction and operation of the invention has been illustrated and described. It is understood that, within the scope of the appended claims, modifications and variations are practical and the invention may be practical other than as specifically illustrated and described.

What is claimed is:

1. A process for hydroconversion of coal solids to liquid and gaseous products comprising bringing coal solids, a gas containing molecular hydrogen and catalyst solids into contact in a coal reaction zone under conditions at which a major portion of said coal solids undergoes hydroconversion to gaseous and liquid products, said catalyst solids being comprised of a catalytically active substance containing molybdenum on an alumina support material and being in a size range between 3 mesh and 200 mesh U.S. Sieve Series, said catalyst solids having a pore volume of at least 0.015 milliliter per gram and an accessible pore distribution such that at least 50 percent of said pores are greater than 1,000 angstroms.

2. The process of claim 1 wherein the coal solids are in the size range of from 8 mesh to 350 mesh and are fed to the reaction zone at a rate between 15 and 250 pounds per hour per cubic foot of said reaction zone, and hydrogen is fed to said reaction zone at a rate sufficient to maintain a hydrogen partial pressure in reaction zone between 400 and 4,000 p.s.i.a., said reaction zone being at a temperature between 750° and 1,000° F.

3. The process of claim 2 wherein the ratio of the rate at which the coal solids are fed to the reaction zone to the catalyst solids in said reaction zone is in the range between 0.5 and 5.0.

4. The process of claim 1 wherein the coal solids are prepared in a slurry with a liquid slurry agent in a mixing zone and the liquid slurry agent and said coal solids are passed upwardly through the reaction zone along with other reaction fluids at a velocity sufficient to maintain the catalyst solids in random motion in liquids in said reaction zone.

5. The process of claim 4 wherein the coal solids are in the size range of from 8 mesh to 350 mesh and are fed to the reaction zone at a rate between 15 and 250 pounds per hour per cubic foot of said reaction zone, and hydrogen is fed to said reaction zone at a rate sufficient to maintain a hydrogen partial pressure in reaction zone between 400 and 4,000 p.s.i.a., said reaction zone being at a temperature between 750° F. and 1,000° F.

6. The process of claim 5 wherein the ratio of the rate at which the coal solids are fed to the reaction zone to the catalyst solids in said reaction zone is in the range between 0.5 and 5.0.

7. The process of claim 5 wherein the slurry contains less than 70 percent coal solids by weight of slurry.

8. The process of claim 7 wherein the ratio of the rate at which the coal solids are fed to the reaction zone to the catalyst solids in said reaction zone is in the range between 0.5 and 5.0.

9. The process of claim 1 wherein the catalyst solids have an accessible pore distribution such that at least 50 percent of said pores are greater than 3,000 angstroms.

10. The process of claim 9 wherein the coal solids are in the size range of from 8 mesh to 350 mesh and are fed to the reaction zone at a rate between 15 and 250 pounds per hour per cubic foot of said reaction zone, and hydrogen is fed to said reaction zone at a rate sufficient to maintain a hydrogen partial pressure in reaction zone between 400 and 4,000 p.s.i.a., said reaction zone being at a temperature between 750° and 1,000° F.

11. The process of claim 10 wherein the ratio of the rate at which the coal solids are fed to the reaction zone to the catalyst solids in said reaction zone is in the range between 0.5 and 5.0.

12. The process of claim 9 wherein the coal solids are prepared in a slurry with a liquid slurry agent in a mixing zone and the liquid slurry agent and said coal solids are passed upwardly through the reaction zone along with other reaction fluids at a velocity sufficient to maintain the catalyst solids in random motion in liquids in said reaction zone.

13. The process of claim 12 wherein the coal solids are in the size range of from 8 mesh to 350 mesh and are fed to the reaction zone at a rate between 15 and 250 pounds per hour per cubic foot of said reaction zone, and hydrogen is fed to said reaction zone at a rate sufficient to maintain a hydrogen partial pressure in reaction zone between 400 and 4,000 p.s.i.a., said reaction zone being at a temperature between 750° and 1,000° F.

14. The process of claim 13 wherein the ratio of the rate at which the coal solids are fed to the reaction zone to the catalyst solids in said reaction zone is in the range between 0.5 and 5.0.

15. The process of claim 12 wherein the slurry contains less than 70 percent coal solids by weight of slurry.

16. The process of claim 15 wherein the ratio of the rate at which the coal solids are fed to the reaction zone to the catalyst solids in said reaction zone is in the range between 0.5 and 5.0.

* * * * *